Jan. 20, 1931.　　　L. W. SOLOMON　　　1,789,848
BOTTLE PROTECTOR
Filed Jan. 5, 1928　　　2 Sheets-Sheet 1
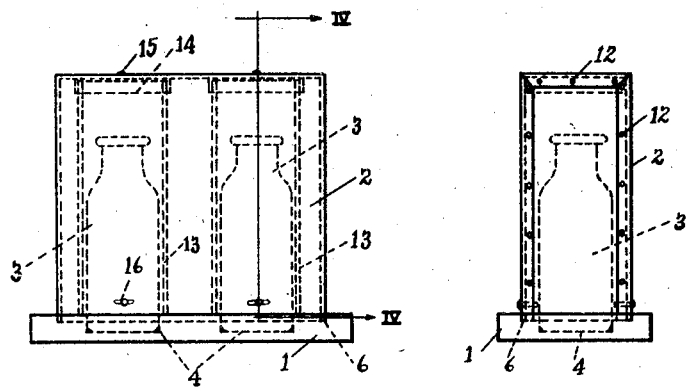
FIG. I　　　FIG. II
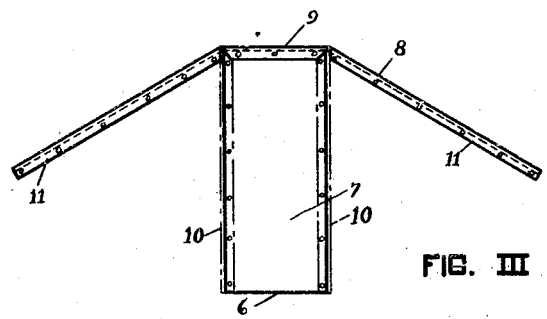
FIG. III
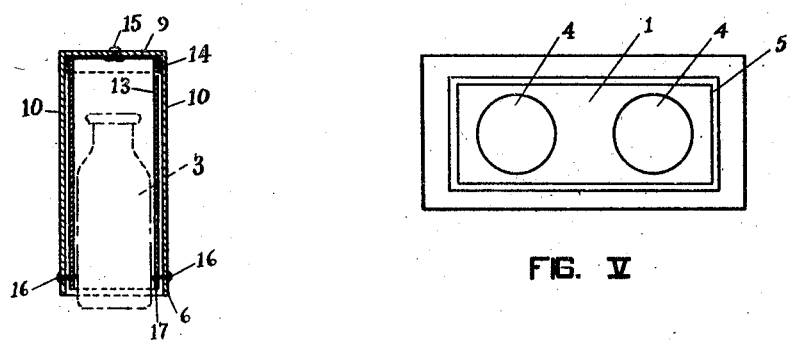
FIG. IV　　　FIG. V
INVENTOR
Louis W. Solomon
by William B. Wharton
his attorney Jan. 20, 1931.  L. W. SOLOMON  1,789,848
BOTTLE PROTECTOR
Filed Jan. 5, 1928  2 Sheets-Sheet 2
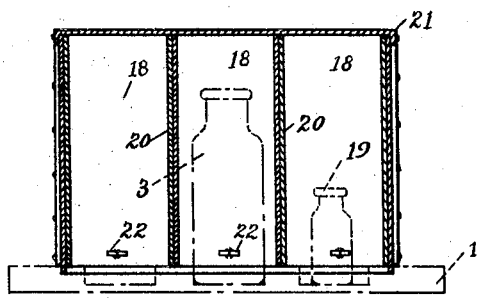
FIG. VI
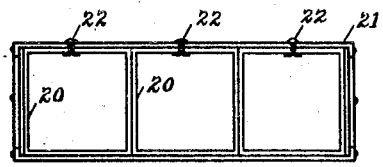
FIG VII
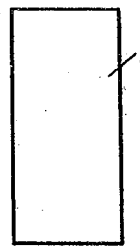
FIG. VIII
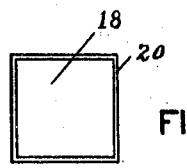
FIG. IX
INVENTOR
Louis W. Solomon
by William B. Wharton
his attorney Patented Jan. 20, 1931

1,789,848

UNITED STATES PATENT OFFICE

LOUIS W. SOLOMON, OF PITTSBURGH, PENNSYLVANIA

BOTTLE PROTECTOR

Application filed January 5, 1928. Serial No. 244,612.

This invention relates to a device for insulating and protecting bottled milk, after it is delivered, at the door and up to the time it is removed by the consumer.

It is the common practice for milk dealers to leave the bottled milk on the porches and door steps of the various homes of their customers. This method of delivery is accompanied by many unsatisfactory incidents. For example, in the winter the temperature often drops below freezing and the unprotected milk freezes in the bottles and destroys certain valuable qualities inherent in milk. The cold often causes the bottles to crack, which results in the loss of both the bottles and their contents. In the summer the delivered milk is open to the usual deleterious effects of the heat before the housewife can place the milk in an ice-chest or refrigerator.

A further, and possibly a more dangerous result of leaving the bottled milk unprotected is that dirt and dust may collect on the cap of the bottle. The moisture that usually is present on top of the bottle attracts various insects, as well as prowling animals. These common carriers of disease deposit germs and unhealthy bacteria in their contact with the bottles of milk. And in view of the fact that many milk consumers simply knock in the cap and use the contents of the bottle, such germs and bacteria are often introduced into the milk.

In order to preserve all of the healthful food value of milk it is necessary to insulate the same from the extreme weather conditions, and it is of importance to cover the bottles and keep them free from dirt.

The object of this invention is to provide a device for protecting and insulating bottled milk from deteriorization due to the heat and cold of the weather.

Another and more specific object of the invention is to provide a cover for milk bottles which is provided with an inexpensive insulative lining, such as may be readily replaced.

In the accompanying drawings Figure I is a side elevation of the device of the present invention; Figure II is an end elevation of the same; Figure III is an end view of the outer box or casing, showing the preferred simple manner of assembling the same; Figure IV is a vertical sectional view taken on the line IV—IV in Fig. I; Figure V is a plan view of the base board which is used in conjunction with the cover; Figure VI is a vertical sectional view through a modified cover portion showing a different arrangement of the insulated milk bottle stalls; Figure VII is a bottom plan view of the modified form of Fig. VI; Figure VIII is a side elevation of one of the insulating partition members; and Figure IX is a bottom plan view of the same.

The reference numeral 1 designates a base to be preferably used in conjunction with the cover box 2 in protecting milk bottles 3, as shown in dotted lines. The base 1 may be made of wood, or may be formed of any suitable cementitious material. The countersunk holes 4 serve as seats to engage the bottoms of the bottles and maintain them in proper alignment. In order that there may be a hermetic sealing between the cover 2 and the base 1 it will be noticed that a groove 5 is embodied in the base 1 to receive the lower periphery 6 of the cover 2. In brief, the purpose of the base 1 is to form aligned seats for the milk bottles in order to make the placement of the cover thereover a quick operation, and it also keeps the bottles from the floor of the steps or porches where ordinarily the bottles are placed. This latter function prevents the bottles from leaving circular stains on the floor and marring the paint, as they often do when placed in contact therewith. The groove 6, as aforesaid, aids in sealing the contents of the box.

The composition of the outer casing, or cover, 2, is functionally unimportant, but for simplicity of manufacture it has been found that composition board is very practical and substantial. As may be seen in Figure III, it is obvious that the outer casing may be made from three pieces of material, such as fibre-board. Two portions, such as indicated by the numeral 7, may form the ends of the box, while one piece 8 is bent from the full line position into the dotted line position to form the tops 9 and two sides 10. Through the flaps 11 suitable fastening means, such as rivets 12, are passed to make the structure firm.

Figures I, II and IV show the cover 2 arranged with cylinders 13 which are composed of heat insulating material, such as corrugated paper board, or asbestos paper board. These tubes 13 are spaced to overlie the bottle seats 4, and as shown form an individual stall for each bottle of milk. Due to the fact that the insulating material is more or less destructible, it is advantageous to provide replaceable liners. A cap 14, conforming in cross section to the insulating tube 13, is fixed under the cover top 9 by means of rivet 15. In case the insulator 13 should wear and necessitate its replacement, the worn tube is removed and a new one is shoved up into the cap 14, and wing clips 16 are passed through suitable holes in the sides 10 and the lower end of the new tube. This gives a rigid means of support for the insulating material in the cover 2. It should be noticed that the lower edge 17 is above the edge 6 to enable the said periphery 6 to sink into the groove 5 of the base 1.

Figures VI to IX, inclusive, show the adaptation of insulating members which are rectangular in cross section. Of course, it is possible to have various sized covers with any desired number of stalls therein. In the figures of the drawings last mentioned, the cover is shown with 3 stalls 18, and it is seen that one stall may be used to house a smaller bottle 19, such as is used for cream. The base portion 1 may be constructed to conform to the special cover for any number of bottles.

The special shape of the modified form of insulating tubes 20 is illustrated in Figures VIII and IX. By having the width of these tubes 20 correspond to the inner breadth of the cover 21 the necessity of a cap portion similar to cap 14 is obviated. The several tubes 20 are pressed into the cover, and simply require clips 22 to retain them in their respective positions. Needless to say, these insulating members may also be readily renewed.

In both forms of box herein described the structure is very inexpensive and simple to manufacture, and in view of the many noxious conditions it prevents, it has found great favor with milk dealers.

What I claim is:

1. In a bottle protecting device, a cover arranged to overlie one or more bottles, insulating material fixed internally of said cover to form separate compartments for each bottle, fastening means arranged to fix the insulating material within said cover and to allow the removal and renewal of the said insulating material.

2. In a bottle protecting device, a base, a cover to overlie bottles placed on said base, insulating material within said cover arranged to form separate compartments for each bottle, removable fastening means to retain the insulating material in said cover and allow a renewal of said insulating material, a groove in said base to receive the periphery of the aforesaid cover.

3. In a bottle protecting device, a base to receive bottles, a cover to encase said bottles, insulating material detachably mounted within said cover, a groove in said base to receive the periphery of said cover, said insulating material stopping short of the periphery of the cover to avoid interfering with the seating of said periphery in said groove.

4. In a bottle protecting device, a base to support bottles, a cover to encase said bottles, insulating material affixed to the walls of said cover, and a groove in said base to receive the periphery of said cover.

In witness whereof, I hereunto set my hand.

LOUIS W. SOLOMON.